Feb. 25, 1930.  F. L. LIPCOT  1,748,074
RUBBER INSULATED STEERING ARM
Filed May 25, 1927
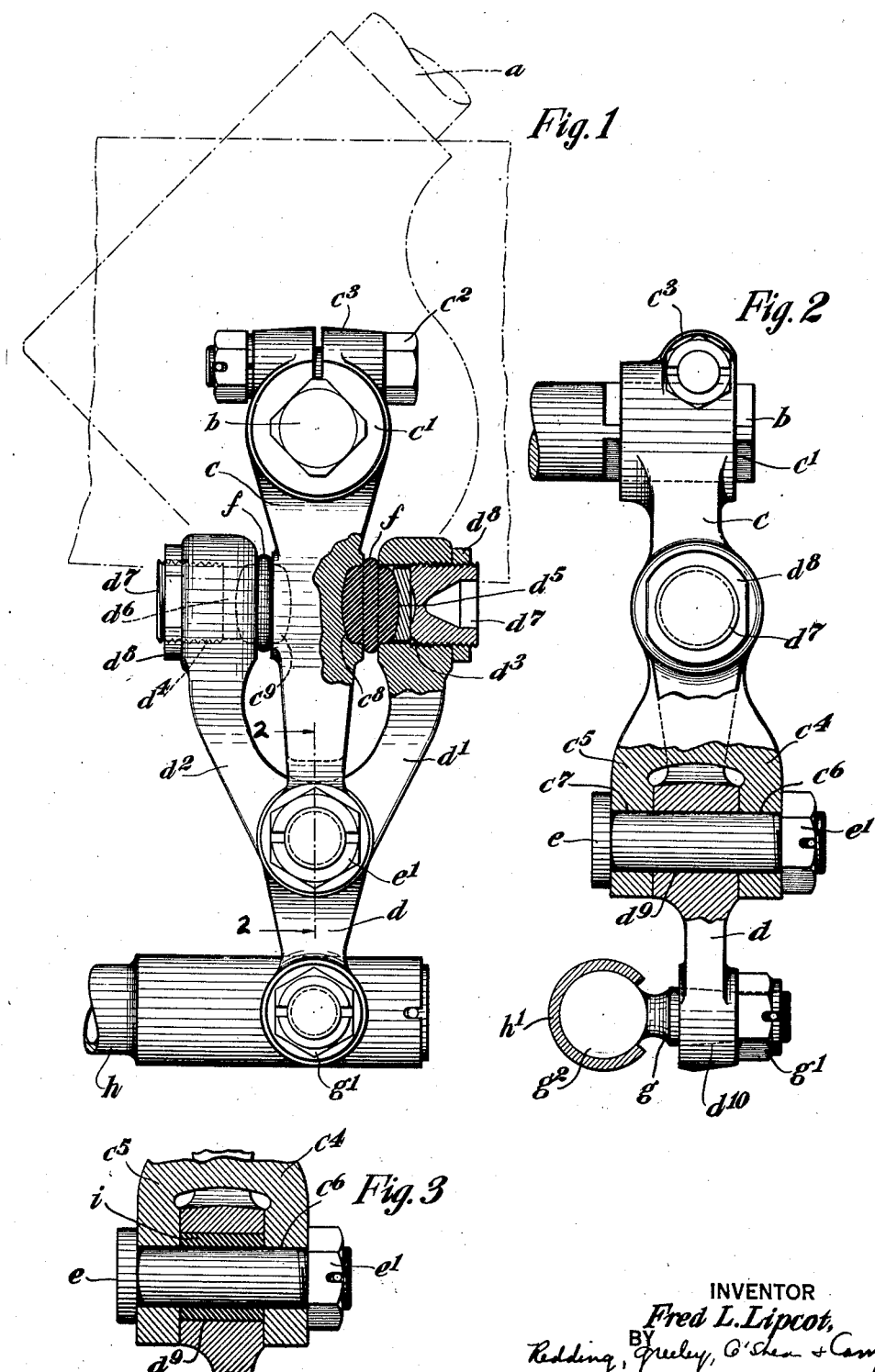
INVENTOR
Fred L. Lipcot,
BY Redding, Greeley, O'Shea & Campbell
his ATTORNEYS Patented Feb. 25, 1930

1,748,074

UNITED STATES PATENT OFFICE

FRED L. LIPCOT, OF NEW YORK, N. Y., ASSIGNOR TO THE RUBBER SHOCK INSULATOR CORPORATION, OF WILMINGTON, DELAWARE, A CORPORATION OF DELAWARE

RUBBER-INSULATED STEERING ARM

Application filed May 25, 1927. Serial No. 193,980.

The desirability of cushioning road shocks and vibrations transmitted to the driver from the steering wheels through steering mechanisms has long been recognized and various constructions have been designed with a view to supplying a mechanism which will provide this function. Failure to adopt these constructions has resulted because they have been unable to transmit the steering stresses with sufficient rigidity to provide for the desired degree of accuracy under all conditions. They have sacrificed positive steering for the ability to absorb shocks.

The present invention is designed to provide the necessary shock cushioning functions while maintaining the desired positiveness of steering and is constructed with a view to provide a highly serviceable and strong mechanism which will outlast the metal constructions in common use. Accordingly, the steering lever is composed of two fork-shaped members, the forks interengaging so that the stems form the extremities of the lever and may be connected in the usual manner to the steering column and drag link respectively. Yielding non-metallic elements, such as rubber, serve to interconnect the forked elements and in this manner the objectionable shocks are absorbed.

The specific construction whereby the above results are accomplished are embodied in the following description and reference will now be had to the accompanying drawings for a more detailed description of the invention, wherein:

Figure 1 is an elevation, partly broken away and in section, showing one form of the invention.

Figure 2 is a section taken on lines 2—2 of Figure 1 and looking in the direction of the arrows.

Figure 3 is a view, showing the sectional connecting portion of Figure 2 with a suitable rubber bushing between the connecting bolt and lower forked member.

Referring to the drawings, $a$ designates a steering column of any desired form provided with a suitable worm and squared stub shaft $b$ for the usual steering lever connection. Mounted upon the stub shaft by a co-operating split bearing $c'$ is a forked member $c$, the end of the stem having the bearing $c'$ formed therein. A bolt $c^2$ passing through projecting shoulders $c^3$ of the bearing is provided to secure the forked member to the stub shaft. The arms $c^4$, $c^5$ of the member $c$ have holes $c^6$, $c^7$ formed therein to receive a connecting bolt and at the bight of the fork, seats $c^8$, $c^9$ are provided to receive yielding elements to be described later.

A second forked member $d$, with its stem extending downwardly, is positioned with the plane of its forked members at a right angle with respect to that of the forked members of the first member $c$. The forks $d'$, $d^2$ are provided with suitable apertures $d^3$, $d^4$ in which are positioned seats $d^5$, $d^6$. Threaded in the outer extremities of the apertures are adjusting nuts $d^7$, lock nuts $d^8$ being provided to position the seats in a desired position.

At the bight of the second forked member, a bearing $d^9$ is formed, it being designed to co-operate with the holes $c^6$, $c^7$ in the arms of the first forked member, to receive a bolt $e$ which passes through them to secure the two members together. A nut and locking pin $e'$ serve to retain the bolt with a suitable clamping action.

In this relation, it will be observed that seats $c^8$ and $c^9$ of the upper member co-operate with the respective opposed seats $d^5$, $d^6$ of the lower member to position yielding non-metallic cushioning elements $f$ therebetween. These may be secured under any desired degree of compression by means of the adjusting nuts $d^7$, it being obvious that the tighter the nuts are adjusted, the more positively will the steering forces be transmitted.

At the lower extremity of the second forked member the usual tapered bearing $d^{10}$ is formed to receive a tapered stub shaft $g$ secured by a nut $g'$. A ball $g^2$ is formed on the end of the shaft to engage a socket $h'$ in a drag link $h$ which constitutes an element of the well known steering mechanism.

As shown in Figure 3, the bearing $d^9$ may be made oversize to receive a rubber or other yielding non-metallic bushing $i$, the bolt $e$ passing therethrough and serving in its usual capacity. This construction affords a more effective damping of the undesirable shocks while not sacrificing any of the desired rigidity due to the relation of the co-operating elements of the respective forked members.

In the construction described above, the lower lever $d$ is a lever of the first class, having its fulcrum at the bolt $e$. Forces transmitted through the lever are impressed upon the upper lever $c$ through the pads $f$, making it a lever of the second class with its fulcrum at the bolt $e$. Thus a common fulcrum is provided between the two levers as well as a design which applies the loads of the two at co-operating and opposed portions on each. Since far more stresses are transmitted in the plane of the drag link in its forward and back movement to steer, than in either direction, the cushioning means have been designed to absorb, most effectively, shocks in such plane.

While the invention has been described with reference to the structure shown in the accompanying drawings, it is obvious that changes may be made without departing from the scope of the invention as defined in the appended claims.

What I claim is:

1. A connection between a drag link and steering column comprising a pair of members pivoted together, yielding non-metallic means in the pivot between the members, and means carried by the members to cushion shocks between the two first mentioned members.

2. A steering connection comprising a pair of forked members, means to mount the members to move as a unit about one end as a pivot, means to pivot one member at its bight between the forks of the other, seats in the forks of the second member, co-operating seats at the bight of the first member and yielding non-metallic material disposed between the respective seats.

3. A steering connection comprising a pair of forked members, means to pivot one member at its bight between the forks of the other, non-metallic cushioning means in the pivot between the members, seats in the forks of the second member, co-operating seats at the bight of the first member and yielding non-metallic material disposed between the respective seats.

4. A steering connection comprising a plurality of forked levers, means to connect one lever at its bight between the forks of the other to provide a common fulcrum and cause the first to be a lever of the first class and the second a lever of the second class, non-metallic cushioning means between the levers at the fulcrums thereof, seats on the forks of the first lever, co-operating seats at the bight of the second lever and non-metallic cushioning means disposed between the seats.

5. A steering connection comprising a pair of forked members, means to pivot the members together, means between one of the members and the forks of the other member for cushioning the shocks transmitted through the steering mechanism, and means in the forks to vary the compression of the cushioning means.

6. A steering connection comprising a pair of forked members, means to pivot the members together, means between one of the members and the forks of the other member for cushioning the shocks transmitted through the steering mechanism, movable seats in the forks and adjustable nuts to position the seats and set up a desired compression on the cushioning means.

This specification signed this 23 day of May A. D. 1927.

FRED L. LIPCOT.